United States Patent
Yoo et al.

(10) Patent No.: US 11,519,714 B2
(45) Date of Patent: Dec. 6, 2022

(54) METHOD AND SYSTEM FOR THREE-DIMENSIONAL AUTOMATIC SCAN BASED PRIMITIVE

(71) Applicant: KOREA INSTITUTE OF SCIENCE AND TECHNOLOGY, Seoul (KR)

(72) Inventors: ByoungHyun Yoo, Seoul (KR); JiHyun Seo, Seoul (KR)

(73) Assignee: KOREA INSTITUTE OF SCIENCE AND TECHNOLOGY, Seoul (KR)

( * ) Notice: Subject to any disclaimer, the term of this patent is extended or adjusted under 35 U.S.C. 154(b) by 395 days.

(21) Appl. No.: 16/794,223

(22) Filed: Feb. 19, 2020

(65) Prior Publication Data

US 2020/0326173 A1    Oct. 15, 2020

(30) Foreign Application Priority Data

Apr. 9, 2019  (KR) .................... 10-2019-0041590

(51) Int. Cl.
| | |
|---|---|
| *G01B 11/24* | (2006.01) |
| *G01B 11/00* | (2006.01) |
| *G06T 15/00* | (2011.01) |
| *G02B 26/10* | (2006.01) |

(52) U.S. Cl.
CPC .......... *G01B 11/002* (2013.01); *G06T 15/005* (2013.01); *G02B 26/10* (2013.01)

(58) Field of Classification Search
CPC ..... G01B 11/002; G01B 11/24; G06T 15/005; G06T 2219/2021; G06T 17/00; G02B 26/10
USPC .......................................................... 382/154
See application file for complete search history.

(56) References Cited

U.S. PATENT DOCUMENTS

2014/0192050 A1* 7/2014 Qiu ..................... G06V 20/653
                                                                345/420
2017/0053438 A1* 2/2017 Huang .................... G06T 17/20

* cited by examiner

*Primary Examiner* — Gordon G Liu
(74) *Attorney, Agent, or Firm* — Cantor Colburn LLP

(57) ABSTRACT

The present invention relates to a method and a system for three-dimensional automatic scan based primitive, and estimates a three-dimensional model of an object from three-dimensional scan data of the object, recognizes a shape of the three-dimensional model by using fitting with at least one primitive, evaluates confidence of each of surface points of the three-dimensional model based on similarity between the at least one primitive used for shape recognition and the shape of the three-dimensional model, and scans the object in a series of views determined based on the confidence of each of the surface points, and thus, accuracy of the three-dimensional scan of the object is improved and time required for scan may be reduced.

14 Claims, 10 Drawing Sheets

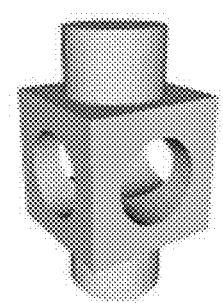
FIG. 5A
FIG. 5B
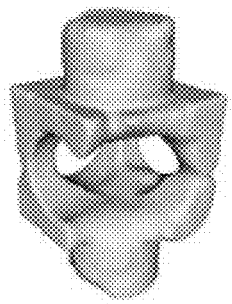
FIG. 5C
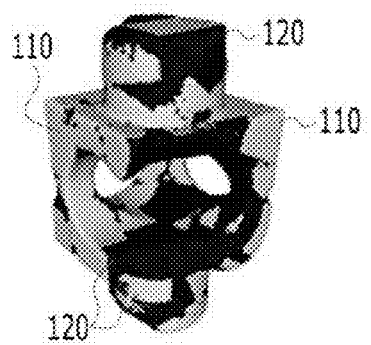
FIG. 5D
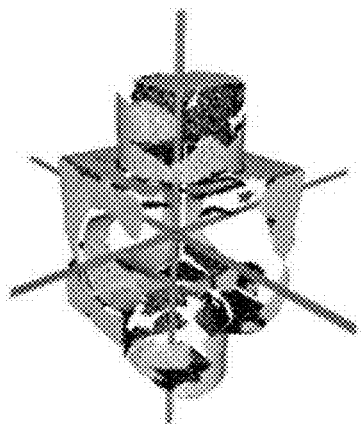
FIG. 5E
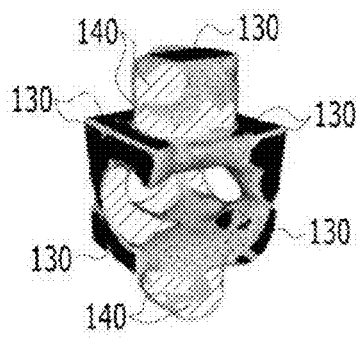
FIG. 5F
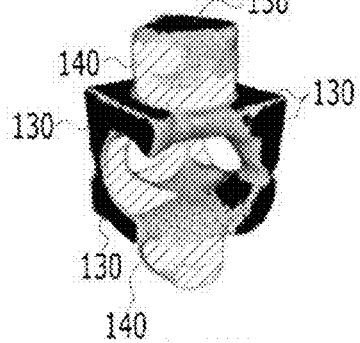
FIG. 5G
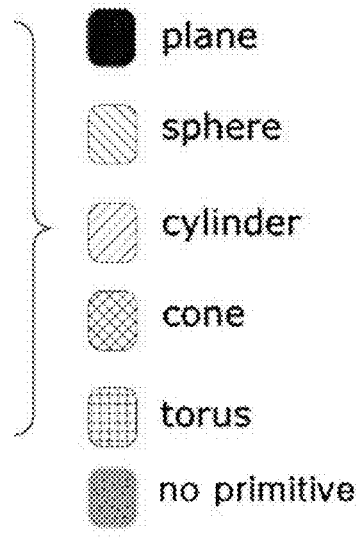
- plane
- sphere
- cylinder
- cone
- torus
- no primitive

METHOD AND SYSTEM FOR THREE-DIMENSIONAL AUTOMATIC SCAN BASED PRIMITIVE

CROSS-REFERENCE TO RELATED APPLICATIONS

The present application claims priority under 35 U.S.C. 119(a) to Korean Application No. 10-2019-0041590, filed on Apr. 9, 2019, in the Korean Intellectual Property Office, which is incorporated herein by reference in its entirety as set forth in full.

BACKGROUND

1. Technical Field

The present invention relates to a method and a system for three-dimensional automatic scan based primitive which repeat three-dimensional scan of an object automatically until confidence is satisfied.

2. Related Art

A three-dimensional scanner refers to a device that generates a three-dimensional model representing a three-dimensional shape of an object by using an image sensor. A three-dimensional scan method is divided into a manual method in which a person picks up a scanner and scans several portions of the object while adjusting a position thereof and an automatic method of scanning several portions of the object while automatically adjusting a position of the scanner or the object by using a robot or the like. The manual method has a problem in that accuracy of scan data is low and there are many unnecessary scan repetitions because a person arbitrarily judges to set the position of the scanner.

Although the automatic method solves the problem of the manual method to some extent, there is a problem in that the accuracy of the scan data varies greatly depending on a shape of the object because the scan of the object is repeated while adjusting the position of the scanner or the object according to a predetermined position or path. Accordingly, most of the automatic method of related art is used only for inspecting the object by determining a position of the scan in advance according to a case where products produced in bulk in a factory are inspected or a case where the objects to be scanned are limited.

In a recent automatic method, there has been an attempt to calculate a movement path of a scanner for scanning a certain object through a mathematical calculation. According to this method, there is a problem that the method is not suitable for scanning an object having many planes and many portions whose shapes rapidly change, such as a mechanical component, by calculating the movement path of the scanner from completeness of a curved surface with respect to the scanned shape of the object. If the mechanical component having many planes and many portions whose shapes rapidly change is scanned by using the method, there is a problems in that accuracy of the three-dimensional scan is very low and scan takes a long time because a scanner continuously repeats scan while staying in the portion whose shape rapidly changes.

SUMMARY

The present invention provides primitive-based three-dimensional automatic scan method and system capable of reducing time required for scan while increasing accuracy of three-dimensional scan by recognizing a shape of a three-dimensional model of an object by using fitting with at least one primitive. Further, the present invention provides a primitive-based three-dimensional automatic scan method and system capable of greatly increasing the accuracy of the three-dimensional model even for a portion which is physically impossible or difficult to be scanned. Further, the present invention provides a primitive-based three-dimensional automatic scan method and system capable of solving a scan technique problem of related art in which scan is continuously repeated for a portion where a surface change of an object is abrupt.

The present invention is not limited to the above-described technical problem, and another technical problem may be derived from the following description.

A method for three-dimensional automatic scan according to an aspect of the present invention includes estimating a three-dimensional model of an object from three-dimensional scan data of the object; recognizing a shape of the estimated three-dimensional model by using fitting with at least one primitive; evaluating confidence of each of surface points of the estimated three-dimensional model based on similarity between the at least one primitive used for shape recognition and the shape of the estimated three-dimensional model; and scanning the object in a series of views determined based on the confidence of each of the surface points.

In recognizing the shape, at least one primitive fitting with the shape of the three-dimensional model may be detected, and the shape of the estimated three-dimensional model may be recognized by using the detected at least one primitive.

In recognizing the shape, at least one primitive fitting with the shape of the three-dimensional model may be detected in a region where scanned points of the three-dimensional scan data exist on the surface of the 3D model.

The three-dimensional automatic scan method may further include modifying the three-dimensional model so as to fit with a shape of the detected at least one primitive.

In evaluating the confidence, confidence of each of surface points of the estimated three-dimensional model may be evaluated based on a distance and a normal direction difference between surface points of a primitive region of the modified three-dimensional model and the surface points of the estimated three-dimensional model.

In estimating the three-dimensional model, the three-dimensional model of the object may be estimated by performing Poisson reconstruction for the three-dimensional scan data, and in evaluating the confidence, primitive confidence of each iso-point of the estimated three-dimensional model may be calculated from the distance and the normal direction difference between an iso-points of a primitive region of the modified three-dimensional model and iso-points of the estimated three-dimensional model, and confidence for each of the iso-points of the estimated three-dimensional model may be evaluated based on the calculated primitive confidence of each of the iso-points.

Evaluating the confidence may include calculating primitive confidence of each iso-point of the estimated three-dimensional model, calculating smoothness confidence of each iso-point of the estimated three-dimensional model, calculating gradient confidence of each iso-point of the estimated three-dimensional model, and calculating a final confidence of each iso-point of the estimated three-dimensional model from the calculated primitive confidence of each iso-point, the calculated smoothness confidence of each iso-point, and the calculated gradient confidence of each iso-point.

The three-dimensional automatic scan method may further include predicting an unscanned portion of each primitive from a shape of the detected each primitive and a boundary of view frustum of a scanner used when scanning a region of the detected each primitive and complementing the estimated three-dimensional model by using the predicted unscanned portion.

In complementing, the estimated three-dimensional model may be complemented by projecting the unscanned portion of each primitive onto an iso-surface outside the boundary of the view frustum and incorporating surface points of the projected portion into each primitive.

The three-dimensional automatic scan method may further include expanding each primitive region by incorporating surface points adjacent to the detected each primitive into each primitive, based on normal direction similarity and proximity between the surface points of the estimated three-dimensional model.

The three-dimensional automatic scan method may further include dividing an iso-surface of the estimated three-dimensional model into patches, and in expanding each primitive region, each primitive region may be expanded by incorporating patches adjacent to the detected each primitive into each primitive, based on the normal direction similarity and the proximity between the surface points of the estimated three-dimensional model.

The three-dimensional automatic scan method may further include estimating a scan avoidance region from an arrangement structure between a plurality of primitives used for shape recognition and determining the series of views based on confidence of each of the surface points and the estimated scan avoidance region.

In determining the series of views, whether or not the plurality of primitives are in contact with each other may be checked, and a boundary of the plurality of primitives in contact with each other may be estimated as the scan avoidance region.

The at least one primitive may correspond to at least one type of primitive among several types of primitives including a plane, a cylinder, a cone, a sphere, and a torus.

According to another aspect of the present invention, a computer-readable recording medium including a program which causes a computer to perform the method is provided.

A system for three-dimensional automatic scan according to another aspect of the present invention includes a model generation unit that estimates a three-dimensional model of an object from three-dimensional scan data of the object; a shape recognition unit that recognizes a shape of the estimated three-dimensional model by using fitting with at least one primitive; a scan evaluation unit that evaluates confidence of each of surface points of the estimated three-dimensional model based on similarity between the at least one primitive used for shape recognition and the shape of the estimated three-dimensional model; and a scanner that scans the object in a series of views determined based on the confidence of each of the surface points.

By recognizing a shape of a three-dimensional model of the object by using fitting with at least one primitive, by evaluating confidence of each of surface points of the three-dimensional model based on similarity between at least one primitive used for shape recognition and a shape of the estimated three-dimensional model, and by scanning the object in a series of views determined based on the confidence of each of the surface points, it is possible to increase accuracy of three-dimensional scan of an object and to reduce time required for scan.

Particularly, since a shape of a mechanical component may be generally represented as a combination of multiple primitives, it is possible to obtain very accurate scan data for the mechanical component and to greatly reduce time required to obtain the very accurate scan data. When the three-dimensional scan results are used to manufacture a replica of a mechanical component, quality of the replica may be greatly improved, and replica manufacturing time may be greatly reduced.

By detecting at least one primitive that fits with a shape of the three-dimensional model, by predicting an unscanned portion of each primitive from a boundary of view frustum of a scanner used when scanning the shape of each detected primitive and a region of each primitive, and by complementing the three-dimensional model by using the predicted portion, it is possible to block scanning the unscanned portion of each primitive in advance, and to greatly reduce the number of scan repetitions. Furthermore, if the unscanned portion of each primitive is a portion where scan is physically impossible or difficult, such as a narrow gap, accuracy of the three-dimensional model may be greatly increased.

By incorporating surface points adjacent to each detected primitive into each primitive based on the normal direction similarity and proximity between the surface points of a three-dimensional model, and by expanding a region of each primitive, an iso-point that is most likely to be a primitive point among the iso-points around a certain primitive as a point of the primitive in advance, and as a result, the number of scan repetitions may be reduced and accuracy of the three-dimensional model may be improved. Particularly, as region expansion of each primitive is performed patch by patch instead of point by point, the time required for completing scan of the object may be greatly reduced.

By estimating a scan avoidance region from an arrangement structure between a plurality of primitives used for shape recognition of a three-dimensional model, and by determining a series of views of a scanner based on the confidence and the scan avoidance region of each of surface points of the three-dimensional model, it is possible to solve a problem of a scan technique of related art in which scan is continuously repeated for a portion where a surface change of an object is abrupt. That is, by estimating a boundary of a plurality of primitives, for example, a corner of a box as a scan avoidance region such that no further scan is performed, it is possible to solve a problem that scan is continuously repeated for a corner of a box.

The present invention is not limited to the above effects, and other effects may be derived from the following description.

BRIEF DESCRIPTION OF THE DRAWINGS

FIGS. 5A to 5G are views illustrating a stepwise change of a three-dimensional model of an object according to the three-dimensional automatic scan method illustrated in FIG. 3.

DETAILED DESCRIPTION OF THE EMBODIMENTS

Various embodiments of the present invention will be described in detail. The embodiments are just for exemplifying the present invention, and claims of the present invention are not limit by the embodiments. Hereinafter, embodiments of the present invention will be described with reference to the drawings. The embodiments of the present invention described below relates to primitive-based three-dimensional automatic scan method and system that increase accuracy of three-dimensional scan and reduce time required for scan by recognizing a shape of a three-dimensional model of an object by using fitting with at least one primitive. Hereinafter, the method and system may be referred to simply as a "three-dimensional (3D) automatic scan method" and a "three-dimensional (3D) automatic scan system".

Figure 1:
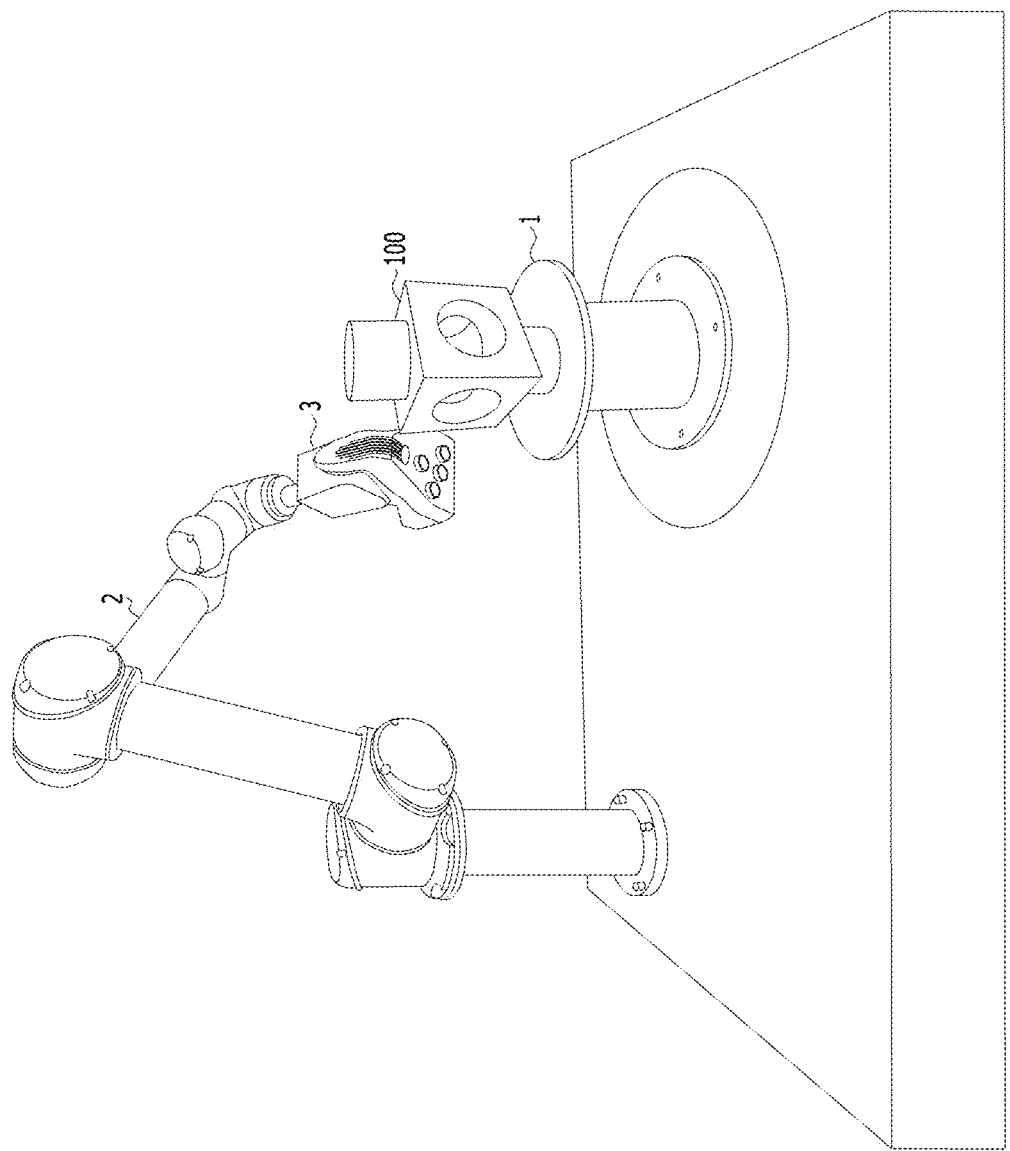
FIGS. 1 to 2 are configuration diagrams of a three-dimensional automatic scan system according to an embodiment of the present invention.
Figure 2:
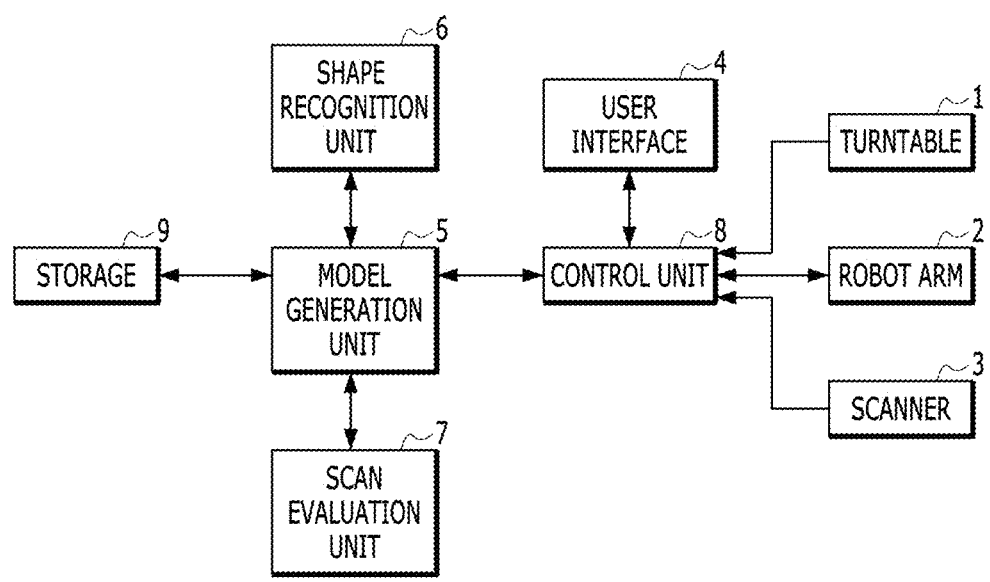

FIGS. 1 to 2 is a configuration diagrams of the three-dimensional automatic scan system according to the embodiment of the present invention. Referring to FIGS. 1 to 2, the three-dimensional automatic scan system according to the present embodiment is configured with a turntable 1, a robot arm 2, a scanner 3, a user interface 4, a model generation unit 5, a shape recognition unit 6, a scan evaluation unit 7, a control unit 8, and a storage 9. The three-dimensional automatic scan system according to the present embodiment may further include other configuration elements in addition to the configuration elements described above. As illustrated in FIG. 1, the three-dimensional automatic scan system according to the present embodiment may further include a housing in which the turntable 1 and the robot arm 2 are installed. The model generation unit 5, the shape recognition unit 6, the scan evaluation unit 7, and the control unit 8 may be implemented by hardware that provides a specific function or may be implemented by a combination of a memory in which software for providing a specific function is recorded, a processor, a bus and the like. The storage 9 may be implemented by a memory, a hard disk, or the like.

The turntable 1 serves to rotate an object 100 mounted thereon under a control of the control unit 8. The robot arm 2 serves to move the scanner 3 mounted at an end of the robot arm 2 under the control of the control unit 8. The turntable 1 and the robotic arm 2 serves to rotate the object 100 and move the scanner 3 such that the scanner 3 may scan the object 100 in a series of views as described below. The turntable 1 and the robotic arm 2 are only examples and other structures may allow the scanner 3 to scan the object 100 in a series of views. For example, the scanner 3 may be moved by a three-dimensional rail of a structure surrounding the object 100.

The scanner 3 generates three-dimensional scan data of the object 100 by scanning the object 100 in a series of views under the control of the control unit 8. The scanner 3 generates the three-dimensional scan data of the object 100 by sequentially generating the three-dimensional scan data for various portions of the object 100 in various view frustums corresponding to a series of views. Three-dimensional scan data is configured by values of numerous scanned points in a three-dimensional modeling space. The value of each scanned point is defined by its three-dimensional coordinates and its color value in the three-dimensional modeling space. When the three-dimensional scan results according to the present embodiment are provided to a three-dimensional printer and used to produce a replica of the object 100, the color value of each scanned point may be omitted because of being meaningless.

The user interface 4 receives certain commands, information, and the like from a user and transmits the same to the control unit 8 or displays some image data input from the control unit 8.

The model generation unit 5 generates a three-dimensional model of the object 100 by acquiring the three-dimensional scan data of the object 100 being scanned by the scanner 3 from the scanner 3 and estimating the three-dimensional model of the object 100 being scanned by the scanner 3 from the three-dimensional scan data thus obtained.

The shape recognition unit 6 recognizes a shape of the three-dimensional model estimated by the model generation unit 5 by using fitting with at least one primitive. Types of primitives according to the present embodiment include a plane, a cylinder, a cone, a sphere, a torus, and the like. At least one primitive used for the shape recognition of the three-dimensional model corresponds to at least one type of primitive among various types of primitives including the plane, the cylinder, the cone, the sphere, and the torus. The plane may be defined by a normal direction and coordinates of one point, the cylinder may be defined by a direction of a central axis, coordinates of the point, and a radius, and the cone may be defined by a direction of a central axis, coordinates of a vertex, and an angle. Those skilled in the art may understand that the sphere, the torus, and other types of primitives may be similarly defined.

The scan evaluation unit 7 evaluates confidence of each of surface points of the three-dimensional model estimated by the model generation unit 5, based on similarity between at least one primitive used for shape recognition of the shape recognition unit 6 and a shape of the three-dimensional model estimated by the model generation unit 5.

The control unit 8 determines a series of views of the scanner 3 based on the confidence of each of the surface points of the three-dimensional model evaluated by the scan evaluation unit 7, and controls operations of the turntable 1 and the robot arm 2 such that the object 100 may be scanned by the scanner 3 in the series of views. The control unit 8 transmits the three-dimensional scan data input from the scanner 3 to the model generation unit 5 while controlling an operation of the scanner 3.

The storage 9 stores various data for three-dimensional automatic scan according to the present embodiment, such as the three-dimensional model of the object 100 generated by the model generation unit 5, parameters for defining at least one primitive used for shape recognition of the shape recognition unit 6, and the confidence of each of the surface points of the three-dimensional model calculated by the scan evaluation unit 7.

Figure 3:
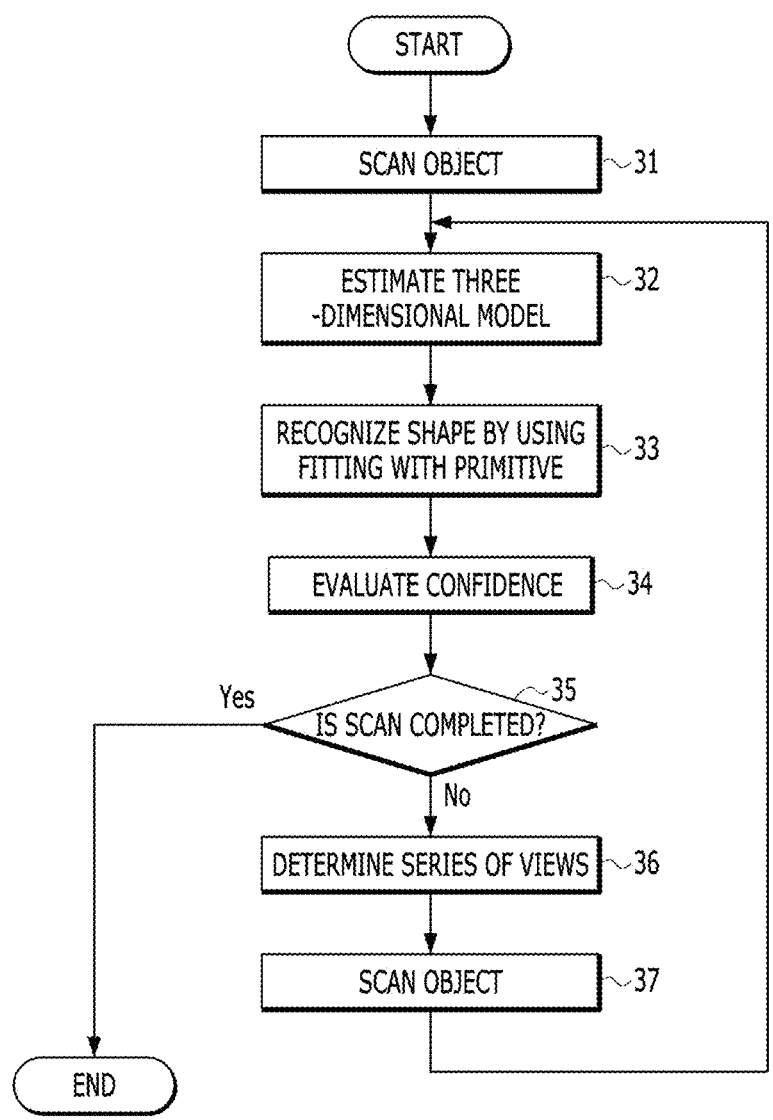
FIG. 3 is a flowchart of a three-dimensional automatic scan method according to the embodiment of the present invention.

FIG. 3 is a flowchart of a three-dimensional automatic scan method according to the embodiment of the present invention. Referring to FIG. 3, the three-dimensional automatic scan method according to the present embodiment includes steps processed by the three-dimensional automatic scan system illustrated in FIGS. 1 and 2 in time series. Thus, although being omitted below, content described above with respect to the three-dimensional automatic scan system illustrated in FIGS. 1 and 2 may be also applied to the three-dimensional automatic scan method which will be described below.

In step 31, the scanner 3 generates the three-dimensional scan data of the object 100 by scanning the object 100 at a position preset by a user or by scanning the object 100 while moving along a path preset by the user. For example, the control unit 8 controls operations of the robot arm 2 and the turntable 1 according to setting information of the user input through the user interface 4 such that the scanner 3 may scan the front and rear of the object 100 rotating according to rotation of the turntable 1 at a certain fixed position. The object scan in step 31 corresponds to scan of a first iteration. Subsequent steps are continuously repeated until the three-dimensional scan data meets target confidence, as described below.

In step 32, the model generation unit 5 receives three-dimensional scan data of the object 100 from the control unit 8 to obtain the three-dimensional scan data of the object 100 generated by the scanner 3 in step 31, and estimates a three-dimensional model of the object 100 from the three-dimensional scan data of the object 100 obtained as described above.

In step 33, the shape recognition unit 6 recognizes a shape of the three-dimensional model estimated in step 33 by using fitting with at least one primitive. The present embodiment does not recognize the shape of the three-dimensional model of the object 100 depending only on scanned points of the scanner 3 and recognizes the shape the three-dimensional model of the object 100 by using the fitting with at least one primitive, and thus, it is possible to quickly recognize a primitive shape of the object 100 that may be reached through scanned point accumulation by repetitive scan of the related art. In conclusion, the present embodiment may reduce the time required for scan while increasing accuracy of three-dimensional scan of the object 100.

In step 34, the scan evaluation unit 7 evaluates confidence of each of the surface points of the three-dimensional model estimated in step 33, based on similarity between at least one primitive used for the shape recognition in step 33 and the shape of the three-dimensional model estimated in step 32. As will be described in detail below, Poisson reconstruction is used to estimate the three-dimensional model of the object 100, and the surface point of the three-dimensional model is a point of an iso-surface which is a surface of the three-dimensional model generated by the Poisson reconstruction. The point of the iso-surface is referred to as an iso-point. Hereinafter, the three-dimensional "surface" and "iso-surface" may be used interchangeably and may be referred to as a "surface point" and an "iso-point" of the three-dimensional model.

In step 35, the scan evaluation unit 7 checks whether or not confidence of each of the surface points evaluated in step 34 satisfies a criterion corresponding to completion of scan. For example, if an error between the previous confidence and the current confidence is within a criterion range corresponding to the completion of scan, it may be determined that the confidence of each of the surface points satisfies the criterion corresponding to the completion of scan. That is, even if the scan for the object 100 is repeated, the scan is completed if a change in the confidence of scan is minimal. If it is determined that the confidence of each of the surface points satisfies the criterion corresponding to the completion of scan, scan of a region recognized as a shape fitting with at least one primitive ends, otherwise the processing proceeds to step 36.

In step 36, the control unit 8 determines a series of views of the scanner 3, based on the confidence of each of the surface points evaluated in step 34. Here, the view of the scanner 3 means a view when the scanner 3 looks at the object 100 and is determined by a position of the scanner 3 and a rotation angle of the turntable 1. This view of the scanner 3 is called a Next Best View (NBV) in a three-dimensional scan field. The series of views of the scanner 3 refers to the NBVs that the scanner 3 should sequentially scan in the next iteration according to the confidence of each of the scanned points evaluated in the current iteration.

In step 37, the control unit 8 controls the operations of the turntable 1 and the robot arm 2, that is, a rotation of the object 100 and a position of the scanner 3 such that the object 100 may be scanned by the scanner 3 in a series of views determined in step 36, and the scanner 3 generates three-dimensional scan data of the object 100 by scanning the object 100 in a series of views determined in step 36 under the control of the control unit 8. If generation of the three-dimensional scan data is completed in step 37, the processing returns to step 32 again, and steps 32 and subsequent steps are repeated until scan quality of the object 100 satisfies a criterion corresponding to the completion of scan. A one-time execution of steps 32-37 is one iteration.

When scan is completed, the three-dimensional scan data generated in step 37 of the last numerical order may be provided as three-dimensional scan results according to the present embodiment, and the three-dimensional model estimated from the three-dimensional scan data generated in step 37 of the last numerical order may be provided as the three-dimensional scan results according to the present embodiment. The three-dimensional scan results may be provided to a three-dimensional printer to be used to produce a replica of the object 100. When the three-dimensional scan results are used to produce a replica of a mechanical component, a quality of the replica may be greatly improved, and a manufacturing time of the replica may be greatly reduced.

Figure 4:
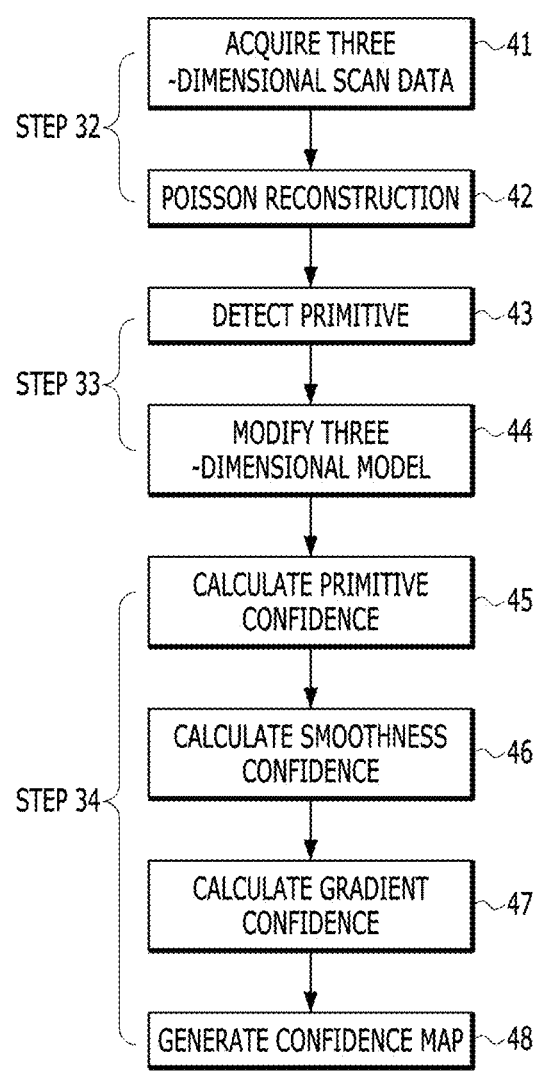
FIG. 4 is a flowchart illustrating a specific example of the three-dimensional automatic scan method illustrated in FIG. 3.

FIG. 4 is a flowchart illustrating a specific example of the three-dimensional automatic scan method illustrated in FIG. 3. FIG. 4 illustrates a specific example of steps 32 to 34 of the steps illustrated in FIG. 3. FIG. 5 are views illustrating a stepwise change of the three-dimensional model of the object 100 according to the three-dimensional automatic scan method illustrated in FIG. 3. FIG. 5A illustrates an example of the object 100 mounted on the turntable 1.

In step 41, the model generation unit 5 acquires the three-dimensional scan data of the object 100 generated by the scanner 3. FIG. 5B illustrates an example of the scanned points of the three-dimensional scan data obtained as such. According to FIG. 5B, a normal direction side of each scanned point is represented brightly, and the opposite side is represented darkly. In the present embodiment, normal directions of each scanned point, each iso-point, and each sample point refers to a normal direction of a surface formed by each point and surrounding points thereof. Whenever the three-dimensional automatic scan method illustrated in FIG. 3 is repeated, scan points are accumulated in the three-dimensional modeling space, and as the number of repetitions of the three-dimensional automatic scan method increases, density of the scanned points is gradually increased, and as a result, accuracy of the three-dimensional model of the object 100 represented by the scanned points is gradually increased.

In step 42, the model generation unit 5 estimates the three-dimensional model of the object 100 by performing Poisson reconstruction for the three-dimensional scan data of the object 100 acquired in step 41. FIG. 5C illustrates a three-dimensional model corresponding to the results of performing the Poisson reconstruction on the scanned points illustrated in FIG. 5B. The scanned points of the three-dimensional scan data may not accurately represent a shape of the object due to performance limitation of the scanner 3, noise in the scan process, and the like. According to the scanned points of the three-dimensional scan data, a surface of the object 100 is unevenly represented. As illustrated in FIG. 5C, the Poisson reconstruction reconstructs the surface of the object 100 by smoothing the uneven surface represented by numerous scanned points of three-dimensional scan data by using a Poisson equation.

The three-dimensional model estimated in step 42 is configured by numerous iso-point values in a three-dimensional modeling space. Each iso-point value is defined by three-dimensional coordinates thereof and a color value thereof in the three-dimensional modeling space. As described above, the surface of the object 100 represented by such numerous iso-points is referred to as an iso-surface. In general, the iso-surface has a mesh structure in which many triangles are continuously connected. Each triangle is defined by three iso-points. Accordingly, according to the three-dimensional scan data, even when a part of a surface of the object is discontinuously expressed, the entire surface of the object is continuously represented after the Poisson reconstruction.

Figure 6:
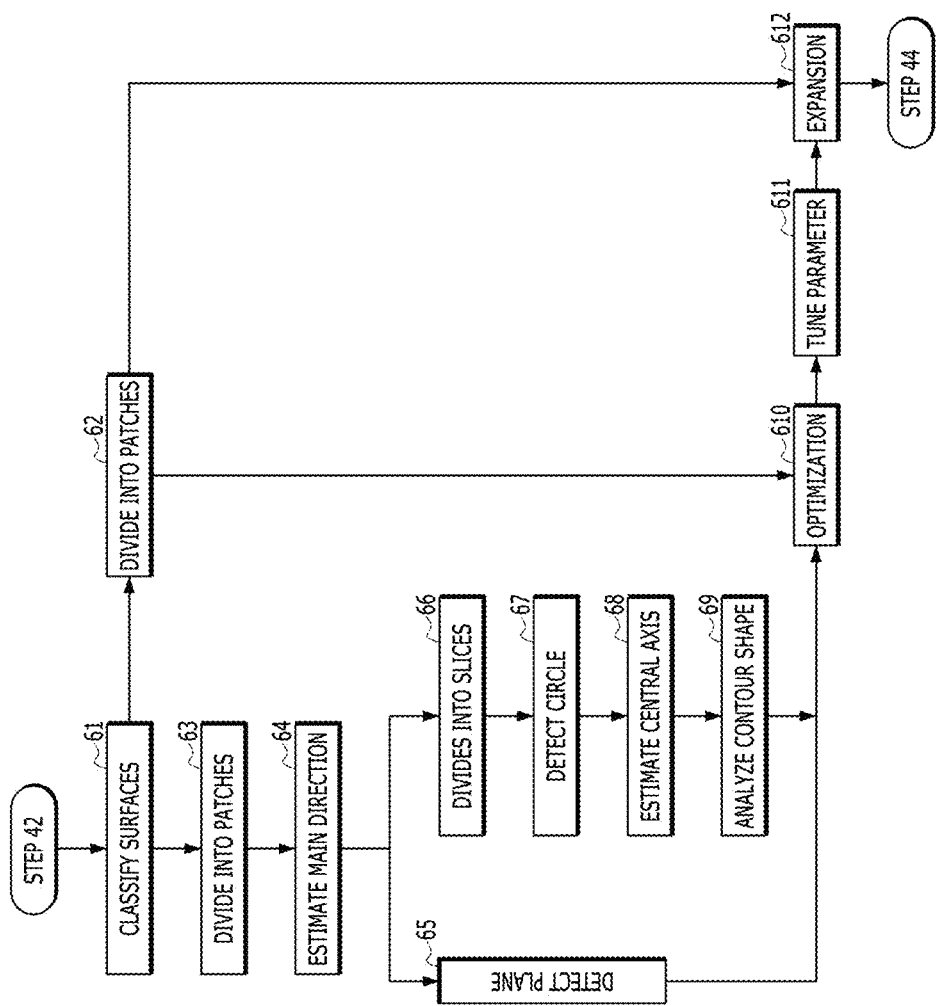
FIG. 6 is a detailed flowchart of a primitive detection process in step 43 illustrated in FIG. 4.

In step 43, the shape recognition unit 6 detects at least one primitive fitting with the shape of the three-dimensional model estimated in step 42, and recognizes the shape of the three-dimensional model estimated in step 42 by using the detected at least one primitive. FIG. 6 is a detailed flowchart of the primitive detection process in step 43 illustrated in FIG. 4. Referring to FIG. 6, the primitive detection process in step 43 includes the following steps.

In step 61, the shape recognition unit 6 classifies the surface of the three-dimensional model estimated in step 42, that is, the iso-surface into a matched region and an unmatched region according to whether or not the surface of the three-dimensional model matches with the actual scanned region in step 31. FIG. 5D illustrates results of classifying the iso-surface illustrated in FIG. 5C. As understood from contrast of FIGS. 5B and 5C, a matched region 110 is represented brightly, and an unmatched region 120 is represented darkly. This classification may prevent an error in advance in which the primitive is detected in artificial parts generated by the Poisson reconstruction, although the classification is not scanned actually.

That is, the shape recognition unit 6 classifies a region having the iso-points existing within a proximity distance from the scanned points of the object 100 among the iso-points forming the iso-surface of the three-dimensional model estimated in step 42 as the matched region, and classifies a region having the remaining iso-points as the unmatched region. Here, the proximity distance is a distance set by a designer of the present embodiment and may be set according to an average distance between the scanned points adjacent to each other. If the proximity distance is too small, a region narrower than the actual scanned region is classified as the matched region, and thereby, recognizable primitive may not be utilized because data necessary for primitive detection is not sufficient, and if the proximity distance is too large, a two wide region is classified as the matched region in addition to the actual scanned region, and thereby, an error of the scan result according to the present embodiment increases because data unnecessary for the primitive detection is included.

As will be described in detail below, the shape recognition unit 6 detects at least one primitive fitting with the shape of the three-dimensional model from the matched region, that is, a region where the scanned points of the three-dimensional scan data exist, among the iso-surfaces of the three-dimensional model estimated in step 42. The unmatched region is a region generated during the reconstruction of the surface represented by the scanned points by using the Poisson equation, although the scanned points of the three-dimensional scan data do not actually exist. Accordingly, there is a possibility that the primitive detected in the unmatched region is the primitive that does not exist in the actual surface shape of the object 100. The present embodiment significantly reduces a detection probability of the primitive not existing in the actual surface shape of the object 100 by detecting at least one primitive fitting with the shape of the three-dimensional model in the region where the scanned points of the three-dimensional scan data exist.

In step 62, the shape recognition unit 6 divides the iso-surface of the three-dimensional model estimated in step 42, into planar patches. The shape recognition unit 6 randomly extracts one seed point from the iso-surface, sets a set of adjacent points having a normal direction within a critical angle from a normal direction of the seed point as one plane patch, repeats this process until no more patches are generated, and thus, the iso-surface may be divided into patches. Since iso-points of each patch may be batch-processed for each two-dimensional plane by the patch division, a processing speed of work such as labeling for each iso-point may be improved.

In step 63, the shape recognition unit 6 samples points at regular intervals in the iso-surface classified as the matched region in step 61. As described above, the iso-surface of the three-dimensional model estimated in step 42 is represented by a plurality of iso-points derived by applying the Poisson equation to the plurality of scanned points. The iso-points are so low in density that the iso-points are not suitable for determining what kind of primitives fitting with the iso-surface. Accordingly, the shape recognition unit 6 performs uniform samples at a tight interval suitable for fitting decision between the iso-surface and the primitive of the three-dimensional model without using the iso-points to determine the fitting between the iso-surface and the primitive of the three-dimensional model and estimated in step 42.

In step 64, the shape recognition unit 6 determines at least one major orientation of the three-dimensional model estimated in step 42 from the normal directions of the sampled points by the sampling in step 63, and classifies the sample points into a planar group and a nonplanar group, based on each major orientation. The shape recognition unit 6 may determine at least one main orientation of the three-dimensional model by grouping similar things of the normal directions of the sample points with each other. Since determination of the major orientation is well known to those skilled in the art, the detailed description thereon will be omitted. FIG. 5E illustrates three major orientations determined for the three-dimensional model illustrated in FIG. 5C.

The shape recognition unit 6 classifies the samples points having the normal directions parallel to each major orientation within an error range into the planar group, and classifies the remaining sampled points into at least one nonplanar group. Here, the error range is a range set by a designer of the present embodiment, and if the error range is too small, a shape of any region is more likely to be recognized as a rotation body even though being an actual plane, and if the error range is too large, the shape of any region is more likely to be recognized as a plane even though the shape of any region is an actual rotation body. The error range appearing below may be understood from the above-described point of view even if there is no special description.

In step 65, the shape recognition unit 6 detects at least one primitive corresponding to a plane type in the matched region classified in step 61 by recognizing at least one region fitting with at least one plane in the plane group according to the classification in step 64 and determining parameters for defining the primitive fitting with each region from values of the sampled points of each region. The shape recognition unit 6 recognizes that among the sampled points belonging to the plane group, the sampled points which are concentrated below the critical interval and whose number of sampled points is greater than or equal to a plane criterion fitting with one plane for each distributed region. The shape recognition unit 6 determines an average normal direction and coordinates of any one point of the sampled points of a region recognized to fit with each plane as parameters of each primitive corresponding to the plane type. Among various types of primitives, the plane may be defined by the normal direction and the coordinates of one point.

In step 66, the shape recognition unit 6 divides the nonplanar group according to the classification in step 64 into slices having a predetermined thickness. In step 67, the shape recognition unit 6 detects slices having a circular cross section among the slices divided in step 66. That is, the shape recognition unit 6 detects the cross section of the slice as a circle if the sampled points around the cross section of the slice are arranged in a circle within the error range. In step 68, the shape recognition unit 6 groups the circular slices detected in step 67 on the basis of continuity of the centers of the slices, and estimates a central axis of each slice group. The shape recognition unit 6 sets the slices whose centers are continuously connected to each other as one slice group. The shape recognition unit 6 estimates the line connecting the centers of the slices corresponding to each slice group as the central axis of each slice group.

In step 69, the shape recognition unit 6 detects at least one primitive corresponding to the nonplanar type in the matched region classified in step 61 by analyzing a contour shape of each slice group by using the central axis estimated in step 68 and determining parameters for defining the primitives fitting with each slice group from the analysis results. When the contour shape of the slice group is a straight line, the contour shape may be classified as a cylinder or a cone, and when the contour shape is a curve, the contour shape may be classified as a sphere or a torus. In the former case, the shape recognition unit 6 recognizes that the cylinder fits with the slice group if the central axis direction and the outline of the slice group are parallel within the error range, and recognizes that the cone fits with the slice group if the central axis direction of the slice group is not parallel to the outline of the slice group.

In the latter case, when the outline of the slice group is a circle, a distance between the center of the circle and the main direction may be classified into a sphere or a torus depending on a distance set by the designer of this embodiment. The shape recognition unit 6 recognizes that the torus fits with the slice group if a distance between the center point of the circle, which is an outline of the slice group, and the main direction is more than half of a radius of the circle, and recognizes that the sphere fits with the slice group if a distance between the center of the circle and the main direction is less than half of the radius of the circle. For example, the shape recognition unit 6 determines a direction of the central axis, coordinates of one point on the central axis, and the radius of the slice group confirmed to be fit with the cylinder as parameters of primitives corresponding to the cylinder type. Further, the shape recognition unit 6 determines the direction of the central axis, vertex coordinates, an angle between the outline and a bottom surface of the slice group confirmed to be fit with the cone as parameters of the primitive corresponding to the cone type. It can be understood that the primitive parameters may also be determined for other nonplanar type primitives such as the torus and the sphere.

In step 610, the shape recognition unit 6 optimizes at least one primitive in the matched region by performing set cover optimization on at least one primitive detected in steps 65 to 69, and collectively assigns labels of each optimized primitive to iso-points located in the region of each primitive patch by patch according to the division in step 62. For example, actually, ten primitives of the matched region may be detected as fifteen primitives because of overlapping each other. The set cover optimization solves this problem by optimizing the fifteen primitives to ten primitives by eliminating the overlapping between each other. Since the set cover optimization is a technique known to those skilled in the art to which the embodiment belongs, detailed description thereon will be omitted. FIG. 5F illustrates an example in which several plane-type primitives 130 and several cylinder-type primitives 140 are detected in the matched region of the three-dimensional model illustrated in FIG. 5A.

The shape recognizing unit 6 assigns a label of the primitive to each value of the iso-points belonging to each primitive region for each primitive detected in steps 65 to 69 among the iso-points of the matched region. As described above, a value of each iso-point includes three-dimensional coordinates and a color value, and if a primitive label is assigned thereto, the value of each iso-point includes the three-dimensional coordinates, the color value, and the primitive label. For example, the shape recognition unit 6 assigns a binary value "000" to each value of the iso-points belonging to a region of a first primitive as a label thereof, and assigns a binary value "001" to each value of the iso-points belonging to a region of a second primitive as a label thereof.

In step 611, the shape recognition unit 6 tunes parameter values detected in steps 65 to 69 according to coordinate values and the normal direction of the scanned points of the three-dimensional scan data. The shape recognition unit 6 tunes the parameter values of each primitive within a predetermined range so as to approach the shape indicated by the coordinate values and the normal direction of the scanned points of a region where each primitive is detected. This process serves to reduce an error of the parameter values of each primitive. As mentioned above, each iso-point is labeled with a certain primitive, and the parameters of the primitive are stored in the storage 9. The tuning of the parameter values of each primitive in step 611 means that the parameter values stored in the storage 9 are updated.

In step 612, the shape recognition unit 6 expands the region of each primitive by incorporating patches adjacent to each primitive detected in steps 65 to 69 into each primitive based on similarity in a normal direction and proximity. That is, the shape recognition unit 6 expands the region of each primitive by incorporating iso-points adjacent to each primitive detected in steps 65 to 69 into each primitive, based on the similarity in the normal direction and proximity between the iso-points of the three-dimensional model estimated in step 42. According to the present embodiment, the number of scan repetitions may be reduced and accuracy of the three-dimensional model may be increases by setting, in advance as a point of the primitive, an iso-point that is most likely to be a point of the primitive among the iso-points around a certain primitive detected in steps 65 to 69. Particularly, as region expansion of each primitive is performed patch by patch instead of point by point, the time required for completing scan of the object 100 may be greatly reduced.

If an edge patch of any primitive detected in steps 65-69 and an unlabeled neighboring patch are placed next to each other and the similarity between each other in the normal direction is higher than an expansion criterion, the shape recognition unit 6 collectively assigns the labels of the primitives to the values of iso-points of neighboring patches. If a labelled edge patch and another unlabeled neighboring patch are placed next to each other and the similarity between each other in the normal direction is higher than the expansion criterion, the shape recognition unit 6 collectively assigns the labels of the primitives to the values of iso-points of another neighboring patches. FIG. 5G illustrates an example in which a region of a plane-type primitive 130 illustrated in FIG. 5F and a region of the cylinder-type primitive 140 illustrated in FIG. 5F are expanded.

Referring back to FIG. 4, in step 44, the shape recognition unit 6 modifies the three-dimensional model estimated in step 42 so as to fit with the shape of at least one primitive detected in step 43. The three-dimensional model modification process is to modify a position and a normal direction of the iso-points corresponding to the primitive so as to fit with the primitive more than before in a state where fitting with the primitives is determined for all the iso-points of the three-dimensional model estimated in step 42. The process of modifying the three-dimensional model in step 44 is not necessarily required and may be omitted. If the scanner 3 has a high performance and an error of the measured value is small, modifying the three-dimensional model estimated in step 42 based on the prediction as described above may also change the detailed shape of the object 100, and when a size of the object 100 is small compared to a size of the view frustum of the scanner 3, an error may be reduced by maintaining rather than modifying the three-dimensional model estimated in step 42.

The three-dimensional scan of the object 100 is repeated as many as dozens of times until confidence of all the surface points of the three-dimensional model is secured sufficiently. The object 100 of the present embodiment is mainly a mechanical component that is a target of reverse engineering, and a shape of the mechanical component may be represented by a combination of multiple primitives, and thus, there is a possibility that the three-dimensional model is estimated to be closer to the shape of the primitive in the process of repeating the three-dimensional scan for the object 100. According to the present embodiment, the number of repetitions of the three-dimensional scan may be reduced by modifying the three-dimensional model in advance to fit with the shape of the primitive.

Figure 7:
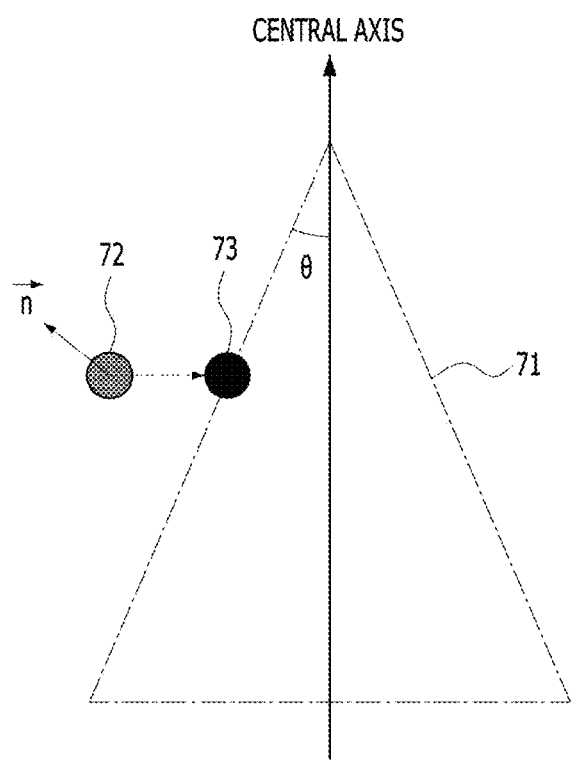
FIG. 7 is a modification example view of the three-dimensional model in step 44 illustrated in FIG. 4.

FIG. 7 is a modification example view of the three-dimensional model in step 44 illustrated in FIG. 4. Referring to FIG. 7, any one iso-point 72 of iso-points having the label of a primitive 71 belonging to a cone type is located out of a cone region defined by parameters of the primitive 71. If a distance "D" between the iso-point 72 and a surface point 73 of the primitive 71 corresponding to each other is smaller than or equal to a critical distance and a normal direction error between the iso-point 72 and the surface point 73 of the primitive is within the critical range (for example, −0 to +10 degrees), the shape recognition unit 6 corrects a coordinate value of the iso-point 72 to a coordinate value of the surface point 73. The surface point 73 of the primitive corresponding to the iso-point 72 refers to the intersection point 73 of a vertical line from the iso-point 72 to the central axis of the primitive 71 and a surface of the primitive 71.

In step 45, the scan evaluation unit 7 calculates primitive confidence of each iso-point of the three-dimensional model estimated in step 42 from a normal direction difference and a distance between the iso-points of the primitive region of the three-dimensional model modified in step 44 and the iso-points of the three-dimensional model estimated in step 42. As the normal direction difference and the distance between the iso-points of the primitive region of the three-dimensional model modified in step 44 and the iso-points of the three-dimensional model estimated in step 42 is small, similarity between at least one primitive used for shape recognition in step 33 and the shape of the three-dimensional model estimated in step 42 is high, and the primitive confidence is calculated high. As the normal direction difference and the distance between the iso-points of the primitive region of the three-dimensional model modified in step 44 and the iso-points of the three-dimensional model estimated in step 42 is large, the similarity between at least one primitive used for shape recognition in step 33 and the shape of the three-dimensional model estimated in step 42 is low, and the primitive confidence is calculated low.

In step 46, the scan evaluation unit 7 calculates smoothness confidence of each iso-point of the three-dimensional model estimated in step 42 from the shape around each iso-point and scanned point density of the three-dimensional model estimated in step 42. The smoothness confidence of each iso-point is calculated high when normal directions of the scanned points close to the iso-points are similar to each other, and is calculated low when a difference there between is large. That is, the iso-points located at a flat or smoothly curved portion tends to have high smoothness confidence even when the scanned points are sparsely located around the iso-point, but the iso-point located at a curved or sharp portion tends to be low in the smoothness confidence unless the scanned points exist therearound in dense density. Since calculating the smoothness confidence is a technique known to those skilled in the art to which the embodiment belongs, more detailed description thereon will be omitted.

In step 47, the scan evaluation unit 7 calculates gradient confidence of each iso-point of the three-dimensional model estimated in step 42 from a density change rate of the scanned points around each iso-point of the three-dimensional model estimated in step 42. The gradient confidence is sometimes called completeness confidence. The gradient confidence is calculated high when density of the scanned points around each iso-point is high and a positional change between the scanned points is moderate, and is calculated low when the density of the scanned points around each iso-point is low and the positional change between the scanned points is sharp. Since calculating the gradient confidence is a technique known to those skilled in the art to which this embodiment belongs, more detailed description thereon will be omitted.

In step 48, the scan evaluation unit 7 generates a confidence map representing a confidence distribution of all iso-points of the three-dimensional model estimated in step 42, that is a surface confidence distribution by calculating final confidence of each iso-point of the three-dimensional model estimated in step 42 from the primitive confidence of each iso-point calculated in step 45, the smoothness confidence of each iso-point calculated in step 46, and the gradient confidence of each iso-point calculated in step 47. For example, the scan evaluation unit 7 may calculate the final confidence of each iso-point by multiplying the primitive confidence of each iso-point calculated in step 45, the smoothness confidence of each iso-point calculated in step 46, and the gradient confidence of each iso-point calculated in step 47.

Like the primitive confidence, the smoothness confidence and the gradient confidence are normalized values between 0 and 1. Accordingly, the final confidence of each iso-point is a value between 0 and 1, and the lower the confidence, the higher the probability of being selected as NBV. When the primitive confidence of the iso-points of a certain primitive detection region is calculated to be high, the confidence is higher than the iso-point of a peripheral region even if the smoothness confidence and the gradient confidence are low. Accordingly, there is a low probability that the primitive detection region is selected as the NBV. In the present embodiment, since the confidence of each iso-point is calculated in consideration of both the smoothness confidence and the gradient confidence in addition to the primitive confidence, disadvantages of the primitive confidence, the smoothness confidence, and the gradient confidence may be mutually complemented. As a result, the confidence of each iso-point may be calculated very accurately.

In step 36, the control unit 8 estimates a scan avoidance region from an arrangement structure between the plurality of primitives used for the shape recognition in step 33, that is, an arrangement structure between the plurality of primitives detected in step 43, and determines a series of views of the scanner 3 based on the confidence of each of the surface points evaluated in step 34 and the scan avoidance region estimated as such. The control unit 8 determines a series of NBVs based on the surface confidence distribution of the three-dimensional model represented by the confidence map generated in step 48. The control unit 8 identifies at least one region in which iso-points of relatively lower confidence than the surroundings are gathered based on the surface confidence distribution of the three-dimensional model represented by the confidence map generated in step 48, and determines a series of NBVs according to the identified at least one region. The control unit 8 determines the NBV in consideration of the normal direction of the iso-points such that a surface of the object 100 may be accurately scanned.

The control unit 8 finally determines the next series of NBVs by removing the NBVs belonging to the scan avoidance region from the series of NBVs determined as such. The control unit 8 checks whether or not the plurality of primitives detected in step 43 are in contact with each other, and may estimate a boundary of the plurality of primitives in contact with each other as the scan avoidance region. For example, in the present embodiment, when scanning a box, an edge of the box is recognized as a boundary where two primitives corresponding to a planar type are in contact with each other, and the edge is not scanned.

In the three-dimensional automatic scan method of related art, the confidence is calculated based on density, continuity, and the like of the scanned points, and thus, the confidence is calculated to be continuously low for the portion where a change is abrupt because the plurality of primitives are in contact with each other. As a result, scan is continuously repeated for the portion where the change is abrupt. In the present embodiment, since a shape of the three-dimensional model is recognized by using fitting with the primitive, the boundary of the plurality of primitives may be accurately recognized even though the change is drastic, and scan is not performed by setting the boundary of the plurality of primitives as a scan avoidance region in consideration of accuracy of the shape recognition.

Figure 8:
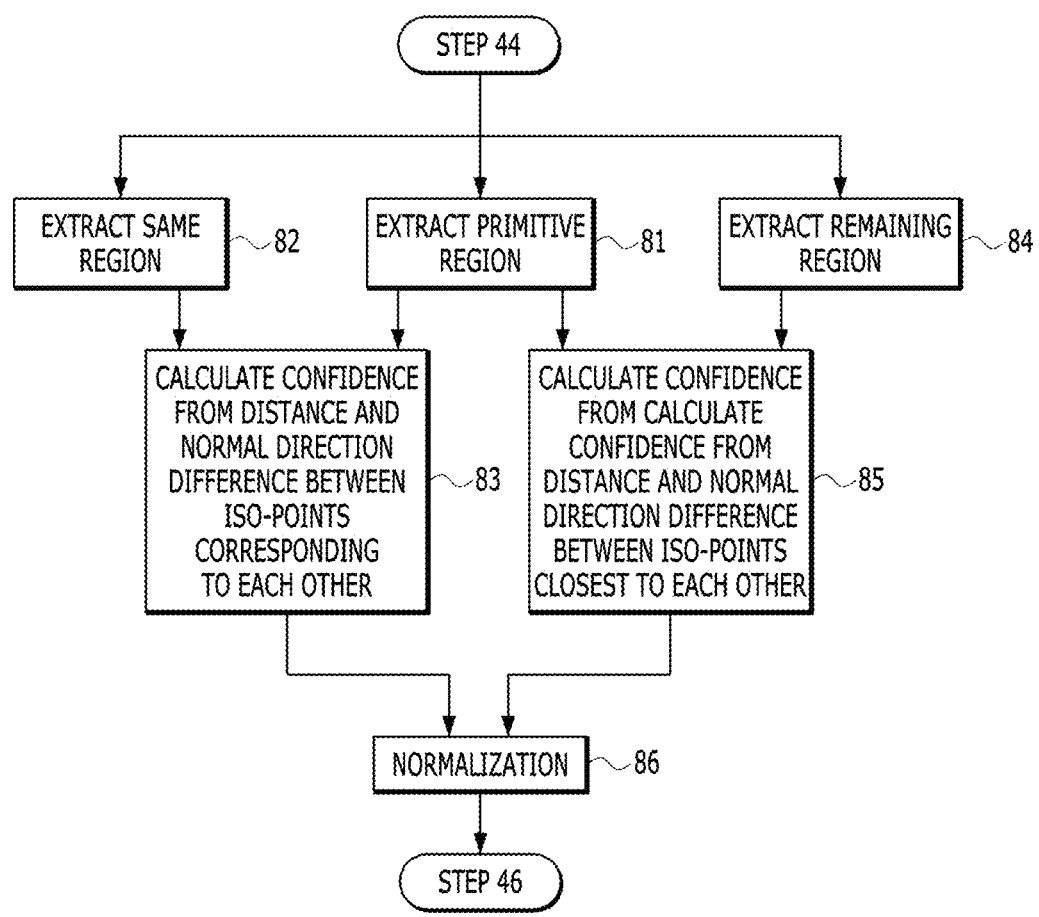
FIG. 8 is a detailed flowchart of step 45 illustrated in FIG. 4.

FIG. 8 is a detailed flowchart of step 45 illustrated in FIG. 4. Referring to FIG. 8, a process of calculating the primitive confidence in 45 steps illustrated in FIG. 4 includes the following steps. In step 81, the scan evaluation unit 7 extracts iso-points of the primitive region detected in step 43 from the modified three-dimensional model in step 44. In step 82, the scan evaluation unit 7 extracts iso-points of the same region as the primitive region extracted in step 62 from the three-dimensional model estimated in step 42, that is, the unmodified model. The iso-points of the primitive region extracted in step 81 and the iso-points of the same region extracted in step 82 correspond one to one. One of the two iso-points corresponding one to one has a value modified to fit with the primitive, and the other has an unmodified value.

In step 83, the scan evaluation unit 7 calculates the primitive confidence of each iso-point of the same region, that is, the primitive region extracted in step 82 from a distance and a normal direction difference between each iso-point of the same region extracted in step 82 and the iso-points of the primitive region having modified value thereof by step 44 for each iso-point of the same region extracted in step 82. For example, the scan evaluation unit 7 may set an inverse of the sum of the distance and the normal direction difference as the primitive confidence of each iso-point. If a certain primitive detected in step 43, for example, a cylinder exactly fits with a region of the three-dimensional model estimated in step 42, then the shape of the region is almost cylindrical. That is, if any primitive detected in step 43 exactly fits with a certain region of the three-dimensional model estimated in step 42, the scan evaluation unit 7 evaluates the confidence of the iso-points of the region very high, and thereby, scanning the region may be prevented from proceeding thereafter.

In step 84, the scan evaluation unit 7 extracts iso-points of the remaining regions other than the primitive region extracted in step 62 from the three-dimensional model estimated in step 42. In step 85, the scan evaluation unit 7 calculates the primitive confidence of each iso-point of the remaining regions extracted in step 84 from the distance and the normal direction difference between each iso-point of the remaining regions extracted in step 84 and the iso-points of the primitive region located closest thereto for each iso-point of the remaining regions extracted in step 84. For example, the scan evaluation unit 7 may set an inverse of the sum of the distance and the normal direction difference as the primitive confidence of each iso-point. In step 86, the scan evaluation unit 7 normalizes the primitive confidence of each iso-point of the primitive region calculated in step 83 and the primitive confidence of each iso-point of the remaining regions calculated in step 85 to a value between 0 and 1.

Figure 9:
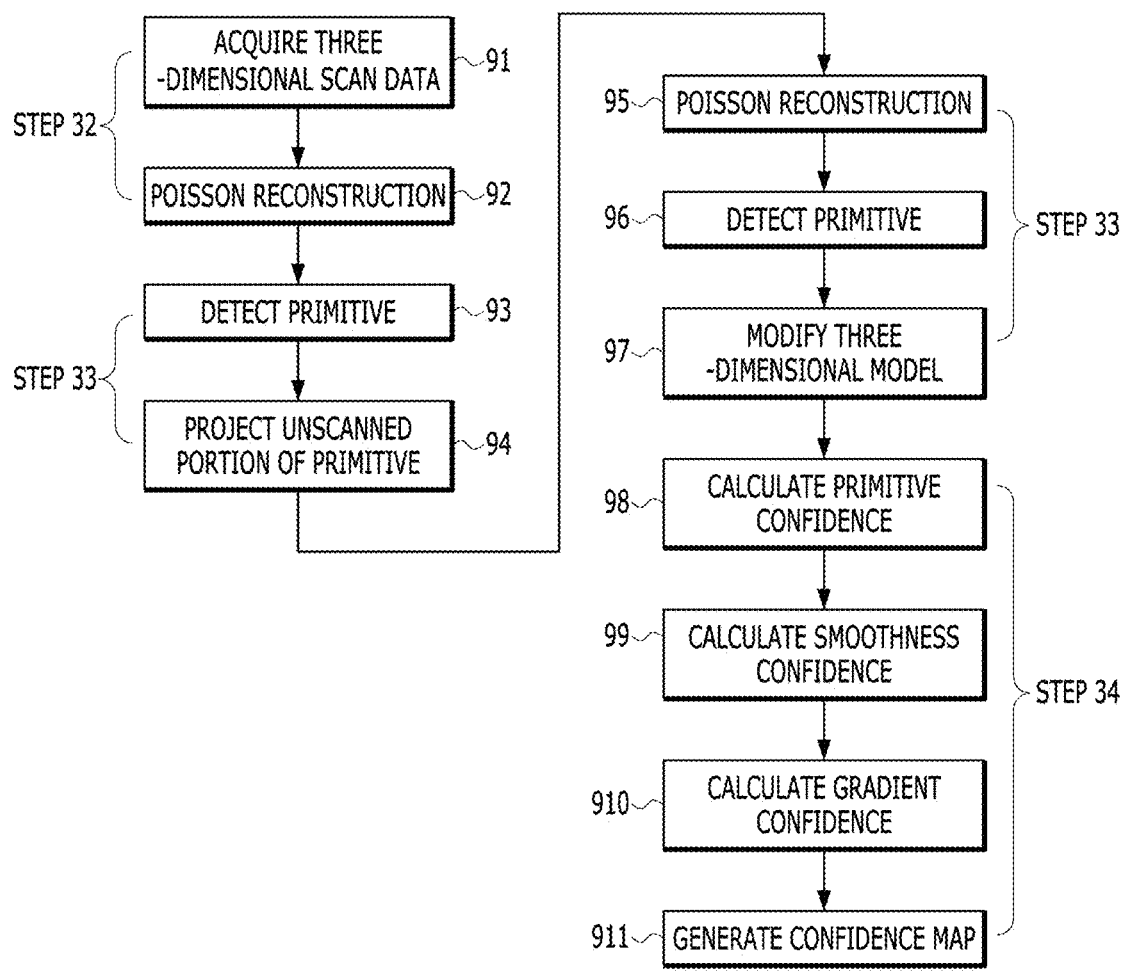
FIG. 9 is a flowchart illustrating another example of the three-dimensional automatic scan method illustrated in FIG. 3.

FIG. 9 is a flowchart illustrating another example of the three-dimensional automatic scan method illustrated in FIG. 3. FIG. 9 illustrates a specific example of steps 32 to 34 among the steps illustrated in FIG. 3 as another example of the example illustrated in FIG. 4. In step 91, the model generation unit 5 acquires three-dimensional scan data of the object 100 generated by the scanner 3. In step 92, the model generation unit 5 estimates the three-dimensional model of the object 100 by performing the Poisson reconstruction on the three-dimensional scan data of the object 100 obtained in step 91. In step 93, the shape recognition unit 6 detects at least one primitive fitting with the shape of the three-dimensional model estimated in step 92. As such, steps 91 to 93 are the same as steps 41 to 43 of the example illustrated in FIG. 4.

In step 94, the shape recognition unit 6 predicts unscanned portion of each primitive from a boundary of the view frustum of the scanner used when scanning the shape of each primitive detected in step 93 and the region of each primitive detected in step 93, and complements the three-dimensional model estimated in step 92 by using the predicted portion. As such, according to the present embodiment, since the unscanned portion of each primitive is predicted and the three-dimensional model is complemented by using the predicted portion, scanning the unscanned portion of each primitive may be blocked in advance, resulting in a great reduction in the number of scan repetitions. Furthermore, if the unscanned portion of each primitive is a part where scan is physically impossible or difficult, such as a narrow gap, accuracy of the three-dimensional model may be greatly increased.

The shape recognition unit 6 projects the unscanned portion of each primitive onto an iso-surface outside the boundary of the view frustum, and incorporates iso-points of the projected portion into each primitive, and thus, the three-dimensional model estimated in step 92 is complemented. In more detail, the shape recognition section 6 incorporates the iso-points of this projected portion into each primitive by projecting the unscanned portion of a certain primitive onto the iso-surface outside the boundary of the view frustum, assigning a label of the primitive to values of each iso-point of the projected portion, and tuning coordinate values of each of the iso-points to fit with the shape of the primitive. Since the iso-surface of the unscanned portion is not an actually measured surface but a surface predicted according to the Poisson reconstruction, a surface of the primitive shape defined by the primitive parameters is more accurate than the iso-surface.

Figure 10:
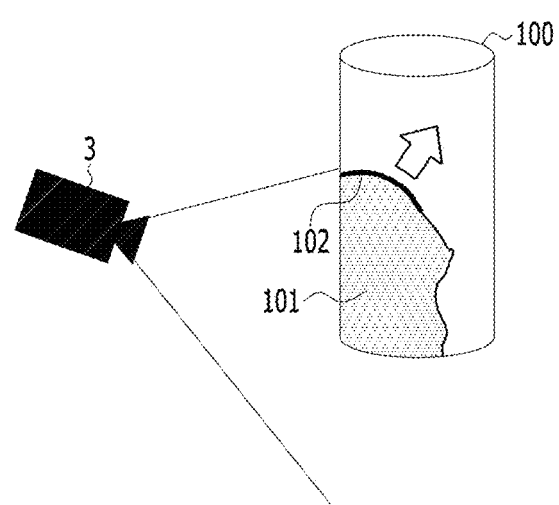
FIG. 10 is a view illustrating an example of a primitive projection in step 94 illustrated in FIG. 9.

FIG. 10 is a view illustrating an example of primitive projection in step 94 illustrated in FIG. 9. Referring to FIG. 10, an example in which the object 100 is a cylinder is illustrated. The primitives corresponding to a cylinder type is detected in the matched region of the three-dimensional model, that is, the scanned region. Since the entire primitive does not enter the view frustum of the scanner 3 placed as illustrated in FIG. 10, scanned points in a state where a part of the primitive is cut off by the boundary of the view frustum are generated by the scanner 3. The shape recognition unit 6 may know the entire shape of the primitive from the parameters of the primitive. Accordingly, the shape recognition unit 6 may predict the unscanned portion of the primitive from the entire shape defined by the parameters of the primitive and the boundary of the view frustum used for scanning the primitive region.

Referring to FIG. 10, a region in the view frustum in which the scanned points of the primitive exist is illustrated by a reference numeral "101". A portion whose primitive is cut by the boundary of the view frustum is illustrated by a thick solid line 102. An outer side of the thick solid line 102 in an arrow direction corresponds to the outer side of the boundary of the view frustum where the scanned points of the primitive exist. The shape recognition unit 6 projects the unscanned portion of the primitive onto an iso-surface of the outer side of the thick solid line 102 in the arrow direction, and incorporates the iso-points of the projected portion into the cylindrical primitive illustrated in FIG. 10.

In step 95, the model generation unit 5 estimates again the three-dimensional model of the object 100 by performing the Poisson reconstruction on the three-dimensional model having scanned points of the three-dimensional scan data acquired in step 91 and iso-points incorporated in each primitive by projection in step 94. The Poisson reconstruction in step 92 is performed on the scanned points of the three-dimensional scan data, but the Poisson reconstruction in step 95 is the same as the Poisson reconstruction in step 92 except that the Poisson reconstruction is performed on the scanned points and iso-points incorporated in each primitive. In step 96, the shape recognition unit 6 detects at least one primitive fitting with the shape of the three-dimensional model estimated in step 95. In step 97, the shape recognition unit 6 modifies the three-dimensional model estimated in step 95 so as to fit with the shape of the at least one primitive detected in step 96. Step 97 is not an essential process that has to be performed for the same reasons as described in step 44 and may be omitted.

In step 98, the scan evaluation unit 7 calculates the primitive confidence of each iso-point of the three-dimensional model estimated in step 95 from the distance and the normal difference between the iso-points of the primitive region of the three-dimensional model modified in step 98 and the iso-points of the three-dimensional model estimated in step 95. In step 99, the scan evaluation unit 7 calculates the smoothness confidence of each iso-point of the three-dimensional model estimated in step 95 from the shape and density of the scanned points around each iso-point of the three-dimensional model estimated in step 95. In step 910, the scan evaluation unit 7 calculates the gradient confidence of each iso-point of the three-dimensional model estimated in step 95 from a change rate of the density of the scanned points around each iso-point of the three-dimensional model estimated in step 95.

In step 911, the scan evaluation unit 7 generates the confidence map representing the confidence distribution of all iso-points of the three-dimensional model estimated in step 95 by calculating the final confidence of each iso-point of the three-dimensional model estimated in step 95 from the primitive confidence of each iso-point calculated in step 98, the smoothness confidence of each iso-point calculated in step 99, and the gradient confidence of each iso-point calculated in step 910. Steps 96 to 911 are the same as steps 43 to 48 illustrated in FIG. 4, and thus, a detailed description thereon will be replaced with description on steps 43 to 48.

Meanwhile, the three-dimensional automatic scan method according to the embodiment of the present invention described above may be written as a program executable in a processor of a computer, and may be implemented in a computer that records the program in a computer-readable recording medium to execute. The computer includes all types of computers capable of executing a programs, such as a desktop computer, a notebook computer, a smartphone, and an embedded type computer. Further, a structure of the data used in the above-described embodiment of the present invention may be recorded in a computer-readable recording medium through various means. The computer-readable recording medium may be a storage medium such as a RAM, a ROM, a magnetic storage medium (for example, a floppy disk, a hard disk, or the like), an optical reading medium (for example, a CD-ROM, a DVD, or the like).

So far, the present embodiment is described mainly based on the preferred embodiments. Those skilled in the art to which the present invention belongs will appreciate that the present invention may be implemented in a modified form without departing from the essential features of the present invention. Therefore, the disclosed embodiments should be considered not in a limitative sense but in a descriptive sense. The scope of the present invention is illustrated in the claims rather than the foregoing description, and all differences within the scope equivalent thereto will be construed as being included in the present invention.

SIGNS LIST 1 turntable
2 robot arm
3 scanner
4 user interface
5 model generation unit
6 shape recognition unit
7 scan evaluation unit
8 control unit
9 storage

What is claimed is:

1. A method for three-dimensional automatic scan based primitive, comprising:
   estimating a three-dimensional model of an object from three-dimensional scan data of the object;
   recognizing a shape of the estimated three-dimensional model by using fitting with at least one primitive, wherein recognizing the shape includes detecting the at least one primitive fitting within the shape of the three-dimensional model;
   predicting an unscanned portion of each primitive from a shape of the detected each primitive and a boundary of view frustum of a scanner used when scanning a region of the detected each primitive;
   complementing the estimated three-dimensional model using the predicted unscanned portion;
   evaluating confidence of each of surface points of the estimated three-dimensional model based on similarity between the at least one primitive used for shape recognition and the shape of the estimated three-dimensional model; and
   scanning the object in a series of views determined based on the confidence of each of the surface points.

2. The method for three-dimensional automatic scan based primitive of claim 1,
   wherein in recognizing the shape, at least one primitive fitting with the shape of the three-dimensional model is detected in a region where scanned points of the three-dimensional scan data exist on the surface of the 3D model.

3. The method for three-dimensional automatic scan based primitive of claim 1, further comprising:
   modifying the three-dimensional model so as to fit with a shape of the detected at least one primitive.

4. The method for three-dimensional automatic scan based primitive of claim 3,
   wherein in evaluating the confidence, confidence of each of surface points of the estimated three-dimensional model is evaluated based on a distance and a normal direction difference between surface points of a primitive region of the modified three-dimensional model and the surface points of the estimated three-dimensional model.

5. The method for three-dimensional automatic scan based primitive of claim 3,
   wherein in estimating the three-dimensional model, the three-dimensional model of the object is estimated by performing Poisson reconstruction for the three-dimensional scan data, and
   wherein in evaluating the confidence, primitive confidence of each iso-point of the estimated three-dimensional model is calculated from the distance and the normal direction difference between an iso-points of a primitive region of the modified three-dimensional model and iso-points of the estimated three-dimensional model, and confidence for each of the iso-points of the estimated three-dimensional model is evaluated based on the calculated primitive confidence of each of the iso-points.

6. The method for three-dimensional automatic scan based primitive claim 5, wherein evaluating the confidence includes
   calculating primitive confidence of each iso-point of the estimated three-dimensional model;
   calculating smoothness confidence of each iso-point of the estimated three-dimensional model;
   calculating gradient confidence of each iso-point of the estimated three-dimensional model; and
   calculating a final confidence of each iso-point of the estimated three-dimensional model from the calculated primitive confidence of each iso-point, the calculated smoothness confidence of each iso-point, and the calculated gradient confidence of each iso-point.

7. The method for three-dimensional automatic scan based primitive of claim 1,
   wherein in complementing, the estimated three-dimensional model is complemented by projecting the unscanned portion of each primitive onto an iso-surface outside the boundary of the view frustum and incorporating surface points of the projected portion into each primitive.

8. The method for three-dimensional automatic scan based primitive of claim 1, further comprising:
   expanding each primitive region by incorporating surface points adjacent to the detected each primitive into each primitive, based on normal direction similarity and proximity between the surface points of the estimated three-dimensional model.

9. The method for three-dimensional automatic scan based primitive of claim 8, further comprising:
   dividing an iso-surface of the estimated three-dimensional model into patches, wherein in expanding each primitive region, each primitive region is expanded by incorporating patches adjacent to the detected each primitive into each primitive, based on the normal direction similarity and the proximity between the surface points of the estimated three-dimensional model.

10. The method for three-dimensional automatic scan based primitive of claim 1, further comprising:
    estimating a scan avoidance region from an arrangement structure between a plurality of primitives used for shape recognition and determining the series of views based on confidence of each of the surface points and the estimated scan avoidance region.

11. The method for three-dimensional automatic scan based primitive of claim 10,
    wherein in determining the series of views, whether or not the plurality of primitives are in contact with each other is checked, and a boundary of the plurality of primitives in contact with each other is estimated as the scan avoidance region.

12. The method for three-dimensional automatic scan based primitive of claim 1,
    wherein the at least one primitive corresponds to at least one type of primitive among several types of primitives including a plane, a cylinder, a cone, a sphere, and a torus.

13. A non-transitory computer-readable recording medium comprising:
- a program which causes a computer to perform the method of claim 1.

14. A system for three-dimensional automatic scan based primitive comprising:
- a model generation unit that estimates a three-dimensional model of an object from three-dimensional scan data of the object;
- a shape recognition unit that recognizes a shape of the estimated three-dimensional model by using fitting with at least one primitive;
- a scan evaluation unit that evaluates confidence of each of surface points of the estimated three-dimensional model based on similarity between the at least one primitive used for shape recognition and the shape of the estimated three-dimensional model; and
- a scanner that scans the object in a series of views determined based on the confidence of each of the surface points,
- wherein the shape recognition unit is further configured to predict an unscanned portion of the at least one primitive from a shape of the at least one primitive and a boundary of view frustum of a scanner used when scanning a region of the at least one primitive.

* * * * *